US009568372B2

(12) United States Patent
Ji

(10) Patent No.: US 9,568,372 B2
(45) Date of Patent: Feb. 14, 2017

(54) APPARATUS FOR CALIBRATING PYROMETER

(71) Applicant: AP SYSTEMS INC., Hwaseong-si, Gyeonggi-do (KR)

(72) Inventor: Sang Hyun Ji, Yongin-si (KR)

(73) Assignee: AP SYSTEMS INC. (KR)

(*) Notice: Subject to any disclaimer, the term of this patent is extended or adjusted under 35 U.S.C. 154(b) by 343 days.

(21) Appl. No.: 14/173,795

(22) Filed: Feb. 5, 2014

(65) Prior Publication Data
US 2014/0219310 A1 Aug. 7, 2014

(30) Foreign Application Priority Data
Feb. 5, 2013 (KR) .................. 10-2013-0012781

(51) Int. Cl.
G01K 15/00 (2006.01)
G01J 5/00 (2006.01)
G01J 5/52 (2006.01)
G01J 5/08 (2006.01)

(52) U.S. Cl.
CPC ............ G01J 5/522 (2013.01); G01J 5/0007 (2013.01); G01J 5/0893 (2013.01)

(58) Field of Classification Search
USPC ........................................... 374/2, 121, 130
See application file for complete search history.

(56) References Cited

U.S. PATENT DOCUMENTS 5,408,100 A 4/1995 Gallivan
5,820,261 A 10/1998 Yam
6,179,465 B1 * 1/2001 Yam ..................... G01J 5/0003
250/252.1
(Continued)

FOREIGN PATENT DOCUMENTS

CN 1008401 B 6/1990
CN 101666684 A 3/2010
(Continued)

OTHER PUBLICATIONS

Schreiber et al, Effects of the self-emission of an IR Fourier-transform spectrometer on measured absorption spectra, Applied Optics, Nov. 1, 1996, vol. 35 No. 31, pp. 6203-6209.*
Material Datasheet, Spectra, 2011.*

Primary Examiner — Mirellys Jagan

(57) ABSTRACT

Disclosed is a calibrating apparatus which is adapted to remove a measurement deviation of a pyrometer, and more particularly, to an apparatus for calibrating a pyrometer, which calibrates a reference value so as to remove a deviation in a temperature measured in a pyrometer. The apparatus for calibrating a pyrometer includes a blackbody including a radiant space from which radiant energy is radiated, a body housing configured to receive the blackbody therein and including a light output wall having a light output port connected with the radiant space, a light output wall protecting cover comprising a transparent blocking plate disposed at a position opposite to the light output port so as to transmit a long wavelength of approximately 5 μm to approximately 20 μm may and configured to be coupled with the light output wall of the body housing, and a fixing member configured to fix the light output wall protecting cover to the light output wall of the body housing.

10 Claims, 6 Drawing Sheets

(56) References Cited

U.S. PATENT DOCUMENTS

| | | | |
|---|---|---|---|
| 7,148,450 B2 * | 12/2006 | Lin | F27B 17/0016 219/385 |
| 7,148,490 B2 * | 12/2006 | Chai | G01N 21/314 250/373 |
| 7,297,938 B2 * | 11/2007 | Fauci | G12B 13/00 250/252.1 |
| 7,837,382 B2 * | 11/2010 | Yamada | G01J 5/522 374/1 |
| 7,838,802 B2 * | 11/2010 | Wen | G01J 5/08 219/385 |
| 7,866,882 B2 * | 1/2011 | Ko | G01J 5/522 374/1 |
| 2002/0021739 A1 * | 2/2002 | Fraden | G01J 5/522 374/2 |
| 2007/0201534 A1 * | 8/2007 | Yamada | G01K 15/002 374/179 |
| 2008/0149861 A1 | 6/2008 | Wilcken et al. | |
| 2008/0192797 A1 * | 8/2008 | Ko | G05D 23/19 374/2 |
| 2009/0139975 A1 * | 6/2009 | Wen | G01J 5/522 374/2 |
| 2010/0290500 A1 | 11/2010 | Zettler et al. | |
| 2012/0170609 A1 | 7/2012 | Gurary et al. | |
| 2014/0219310 A1 * | 8/2014 | Ji | G01J 5/522 374/2 |

FOREIGN PATENT DOCUMENTS

| | | |
|---|---|---|
| CN | 101873728 A | 10/2010 |
| CN | 202013242 U | 10/2011 |
| EP | 0872718 A2 | 10/1998 |
| EP | 2538187 A1 | 12/2012 |
| JP | 57131027 A * | 8/1982 |
| JP | 58160828 A * | 9/1983 |
| JP | 6086432 A | 5/1985 |
| JP | 60118735 | 8/1985 |
| JP | 63247587 | 10/1988 |
| JP | 01183620 | 7/1989 |
| JP | 09079911 | 3/1997 |
| JP | 2002257642 | 9/2002 |
| JP | 2014153356 A | 8/2014 |
| KR | 20020019016 | 3/2002 |
| KR | 10523786 B | 10/2005 |
| KR | 20110053036 | 5/2011 |
| TW | 269726 B | 2/1996 |
| TW | 523845 B | 3/2003 |

* cited by examiner

< PRIOR ART >

< PRIOR ART >

201 : 201a, 201b, 201c, 201d
240 : 240a, 240b
250 : 250a, 250b, 250c, 250d

102 : 102a, 102b, 102c, 102d
201 : 201a, 201b, 201c, 201d
300 : 300a, 300b, 300c, 300d

APPARATUS FOR CALIBRATING PYROMETER

CROSS-REFERENCE TO RELATED APPLICATION

This application claims priority to Korean Patent Application No. 10-2013-0012781 filed on Feb. 5, 2013 and all the benefits accruing therefrom under 35 U.S.C. §119, the contents of which are incorporated by reference in their entirety.

BACKGROUND

The present disclosure relates to a calibrating apparatus which removes a measurement deviation of a pyrometer, and more particularly, to an apparatus for calibrating a pyrometer, which calibrates a reference value so as to measured a low temperature without a deviation in a temperature.

In a heat treatment apparatus which performs a heat treatment process with respect to a substrate, heat is supplied to a silicon substrate using a heating lamp such as a halogen lamp, and a temperature of the substrate is measured through an optical probe, and the measured temperature of the substrate is fed back to a heating controller so as to control the heating lamp.

FIG. 1 is a schematic view illustrating a low temperature heat treatment apparatus. As illustrated in FIG. 1, in a state in which a substrate 20 is installed at an edge ring 30 in a process chamber 10, a heat treatment is carried out by a plurality of heating lamps 61, and a temperature of the substrate 20 is measured by a low temperature measuring pyrometer 40 in a non-contact manner. That is, the temperature measuring pyrometer 40 serves to concentrate a radiant energy intensity of approximately 5 µm to approximately 20 µm, which has a low temperature of approximately 600° C. or less and is radiated from the substrate 20, through a lens 41 and then calculate the temperature of the substrate in the non-contact manner, based on blackbody radiation temperature relationship. The temperature calculated by the temperature measuring pyrometer 40 is fed back to a heating part 60 through a heating controller 50 so as to control temperature of the plurality of heating lamp 61.

Meanwhile, when the temperature measuring pyrometer 40 is assembled to the heat treatment apparatus for the first time, a reference vale of the temperature measuring pyrometer 40 should be calibrated in order to calculate a correct temperature when the temperature measuring pyrometer 40 is exposed to the radiant energy from the heated substrate. Further, when the temperature measuring pyrometer 40 is used for a long time, the temperature detected by the temperature measuring pyrometer 40 may not be correct, and it is necessary to periodically re-calibrate the temperature measuring pyrometer 40. For example, when an area through which light radiated from the substrate during heating of the substrate passes is contaminated, the measured temperature may not be correct, and thus a corresponding re-calibration operation is needed.

The calibration of the reference value with respect to the temperature measuring pyrometer is performed through a deviation correction of approximately ±1 by a calibrating apparatus using a blackbody.

FIG. 2 is a view illustrating a state in which a calibrating apparatus is in contact with a temperature measuring pyrometer in order to calibrate the temperature measuring pyrometer using the calibrating apparatus. The calibrating apparatus 1 has a blackbody 110 therein, and radiant energy radiated from a radiant space S in the blackbody 110 is released through a light output port to an outside. Therefore, the radiant energy released through the light output port to the outside may be transmitted to a lens 41 provided at the temperature measuring pyrometer 40 arranged at the light output port. Therefore, when the blackbody 110 in the calibrating apparatus is set to a certain temperature, e.g., approximately 600° C., the corresponding radiant energy is transmitted to the temperature measuring pyrometer 40, and a temperature correction of the temperature measuring pyrometer 40 is performed to correspond to the temperature of the blackbody 110, i.e., approximately 600° C. For example, if a temperature calculated by the temperature measuring pyrometer 40 is approximately 598° C. in a situation in which the radiant energy of approximately 600° C. is actually released from the radiant space S of the blackbody 110, the reference value used for calculating the temperature in the temperature measuring pyrometer 40 is calibrated to correspond to the temperature of approximately 600° C.

Meanwhile, in the calibrating apparatus 1, the radiant energy radiated from the radiant space S enclosed by the blackbody 110 is radiated through a light output port C of the calibrating apparatus 1. The radiant energy radiated through the light output port C may be transferred to the pyrometer 40 through a tube passage 71 of a substrate stage block housing 70. Since the light output port C has a structure in which the radiant space S is communicated with an external environment, foreign substances may be usually introduced into the radiant space S through the light output port C.

Even though the light output port is blocked by a blocking plate in order to prevent introduction of the foreign substances, the radiant energy radiated from the radiant space S in the calibrating apparatus is blocked by the blocking plate, and a thermal efficiency is also deteriorated.

Particularly, although the blocking plate made of a transparent material is provided at the light output port, the radiant energy having a long wavelength and a temperature of approximately 600° C. or less radiated from the radiant space S of the blackbody may be hardly transmitted. That is, in case of the heat treatment apparatus having a low temperature of approximately 600° C. or less, it is necessary to calibrate the low temperature measuring pyrometer in order to exactly read the temperature of approximately 600° C. or less. Therefore, for an calibrating operation, the blackbody 1 of the calibrating apparatus radiates the radiant energy having a long wavelength of approximately 5 µm to approximately 20 µm and the temperature of approximately 600° C. or less. The blocking plate made of a general transparent material, such as glass and quartz, may hardly transmit the radiant energy having the long wavelength of approximately 5 µm to approximately 20 µm.

RELATED TECHNICAL DOCUMENTS

Patent Documents

Korean Patent Publication No. 10-2002-0019016 (Mar. 9, 2002)

SUMMARY

The present disclosure provides an apparatus for calibrating a pyrometer, which calibrates a temperature deviation of a temperature measuring pyrometer.

The present disclosure also provides an apparatus for calibrating a pyrometer, which heats a blackbody disposed therein and thus reduce a time required until the blackbody arrives at a reference temperature.

The present disclosure also provides an apparatus for calibrating a pyrometer, which minimizes introduction of foreign substances into the blackbody and also stabilizes a temperature of the blackbody as soon as possible.

In accordance with an exemplary embodiment, an apparatus for calibrating a pyrometer includes a blackbody including a radiant space from which radiant energy is radiated, a body housing configured to receive the blackbody therein and including a light output wall having a light output port connected with the radiant space, a light output wall protecting cover including a transparent blocking plate disposed at a position opposite to the light output port so as to transmit a long wavelength of approximately 5 μm to approximately 20 μm may and configured to be coupled with the light output wall of the body housing, and a fixing member configured to fix the light output wall protecting cover to the light output wall of the body housing.

The transparent blocking plate may be made of one of $BaF_2$, $CaF_2$ and Ge compounds.

The transparent blocking plate may be embodied into one of a convex lens, a concave lens, an assembly of the convex lenses, an assembly of the concave lenses, and an assembly of the convex lenses and concave lenses.

The light output wall protecting cover may be spaced apart from and coupled to the light output wall of the body housing so as to define a passage connecting the light output port of the body housing and an external environment.

The light output wall protecting cover may include a cover plate including an inner surface opposite to the light output wall of the body housing and an outer surface located at an opposite side of the inner surface; a cover through-hole configured to pass through the inner surface and the outer surface at a position opposite to the light output port; a transparent blocking plate coupling portion which is a through-portion protruding from the outer surface and including a central hole connected with the cover through-hole and a transparent blocking plate which blocks the central hole; a separation member configured to protrude on the inner surface so as to enable a protruding surface thereof to be in contact with the light output wall of the body housing; and a cover fixing hole configured to pass through the protruding surface of the separation member and the outer surface.

An edge of the inner surface may include a first inclined surface configured so that a thickness of the cover plate becomes thinner toward a distal end of the cover plate.

An edge of the light output wall of the body housing may include a second inclined surface configured to be opposite to the first inclined surface so as to have a uniform separation space between the first and second inclined surfaces.

The light output wall of the body housing may include a central light output wall configured to be is covered by the light output wall protecting cover spaced apart therefrom and coupled thereto; an edge light output wall configured to be not covered by the light output wall protecting cover, and the central light output wall and the edge light output wall may have a thickness difference so that a thickness of the central light output wall is smaller than that of the edge light output wall.

The central light output wall may have a donut shape including inner and outer circumferences, and the inner circumference of the central light output wall is in contact with the light output port.

The light output wall protecting cover may have a smaller diameter than that of the outer circumference, and the light output wall protecting cover may be spaced apart from and coupled to the central light output wall in the outer circumference of the central light output wall.

The transparent blocking plate coupling portion may include a first circumferential through-portion including a first inner circumference and a first circumferential protruding surface configured to protrude from the outer surface of the cover through-hole; a second circumferential through-portion including a second inner circumference having a larger diameter than that of the first inner circumference, and a second circumferential screw thread configured to be defined in an inner surface of the second inner circumference; the transparent blocking plate configured to have inner surface and outer surface, the inner surface being settled to the first circumferential protruding surface; and a circumferential ring configured to be in contact with the outer surface of the transparent blocking plate, coupled along the second circumferential screw thread and fix the transparent blocking plate to the first circumferential protruding surface.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
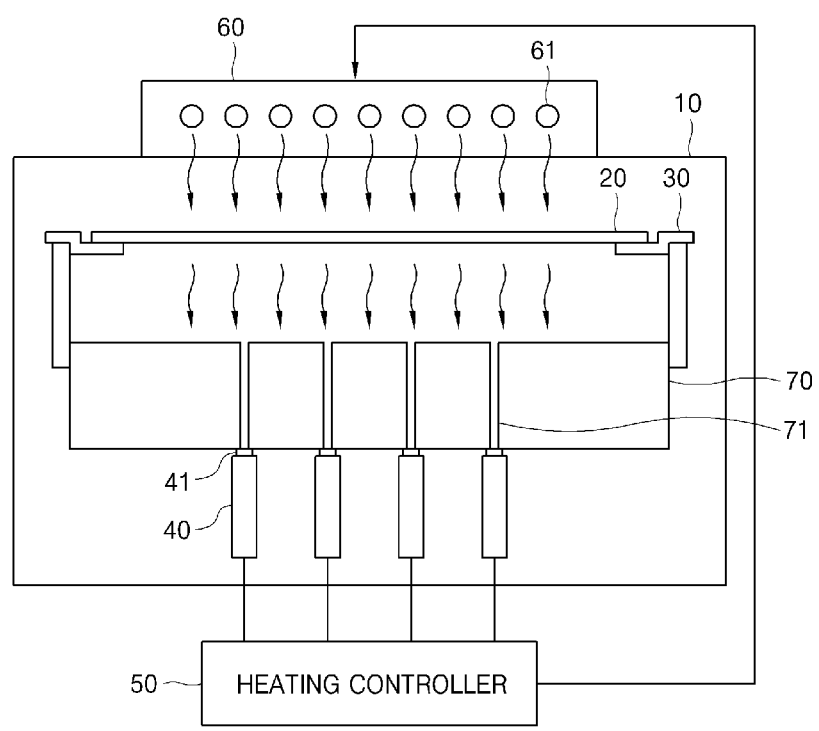
FIG. 1 is a schematic view illustrating a heat treatment apparatus.
Figure 2:
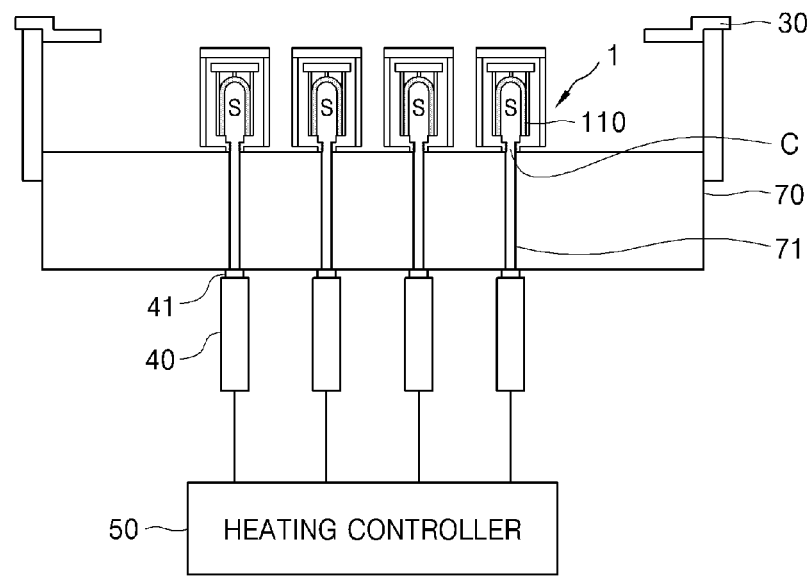
FIG. 2 is a view illustrating a state in which a calibrating apparatus is in contact with a quartz rod in order to calibrate a temperature measuring pyrometer using the calibrating apparatus.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, like reference numerals refer to like elements throughout.

Hereinafter, a temperature measuring pyrometer means a non-contact type temperature measuring device which measures a temperature by measuring radiant energy, and more particularly, a device which measures the temperature in a non-contact manner using low temperature radiant energy.

Figure 3:
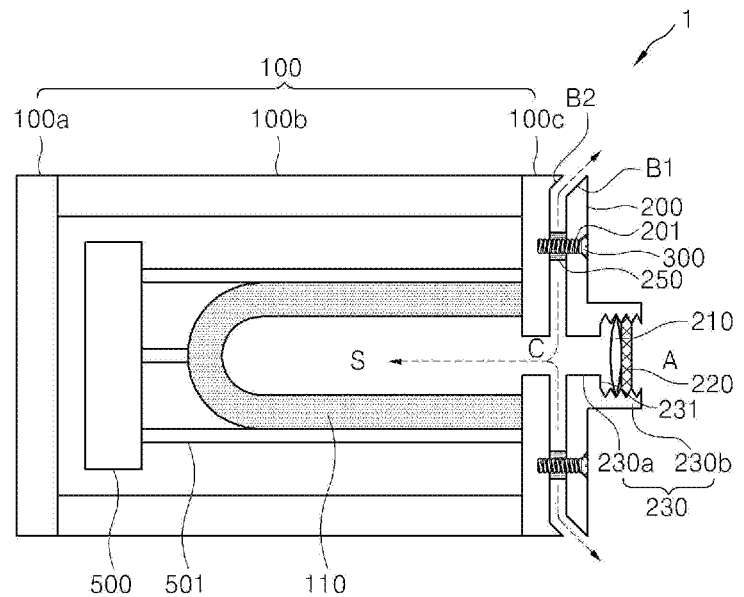
FIG. 3 is a cross-sectional view of a calibrating apparatus in accordance with an exemplary embodiment.
Figure 4:
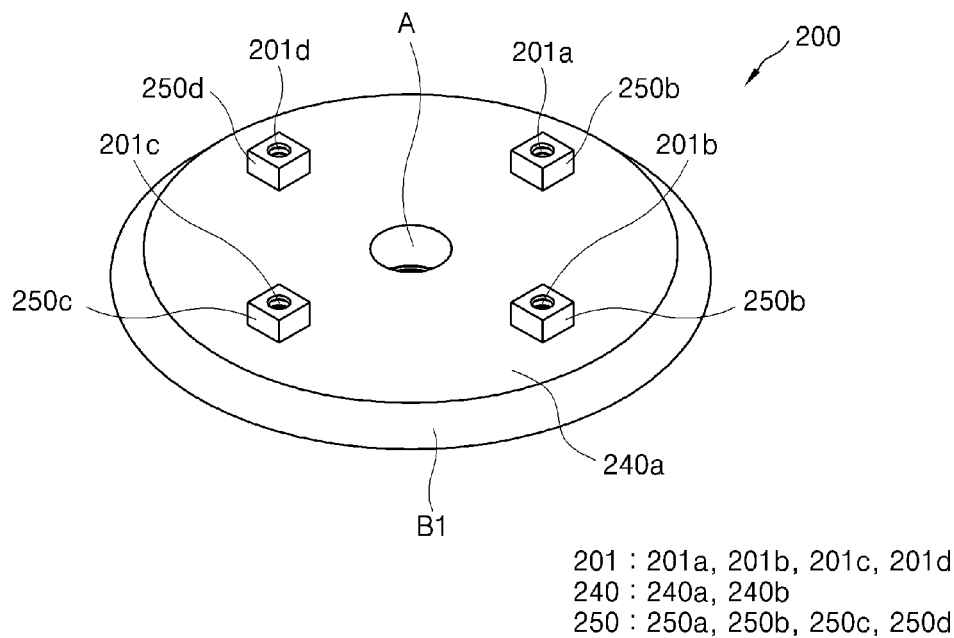
FIG. 4 is a view illustrating an inner surface of a light output wall protecting cover which is spaced apart from and coupled to one side wall of a body housing in accordance with the exemplary embodiment.
Figure 5:
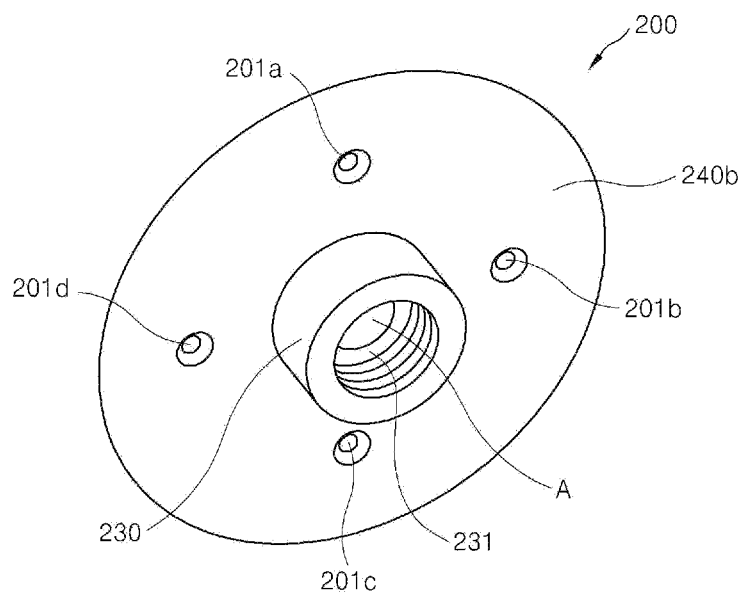
FIG. 5 is a view illustrating an outer surface of the light output wall protecting cover in accordance with the exemplary embodiment.
Figure 6:
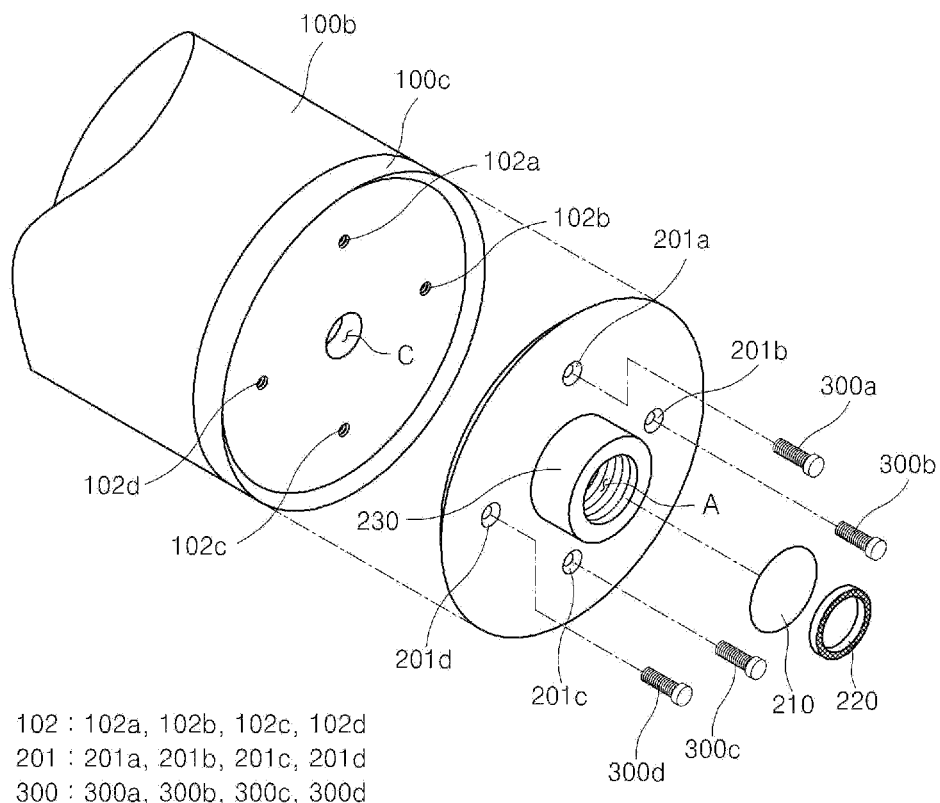
FIG. 6 is a view illustrating the light output wall protecting cover before being coupled to a light output wall of the body housing in accordance with the exemplary embodiment.
Figure 7:
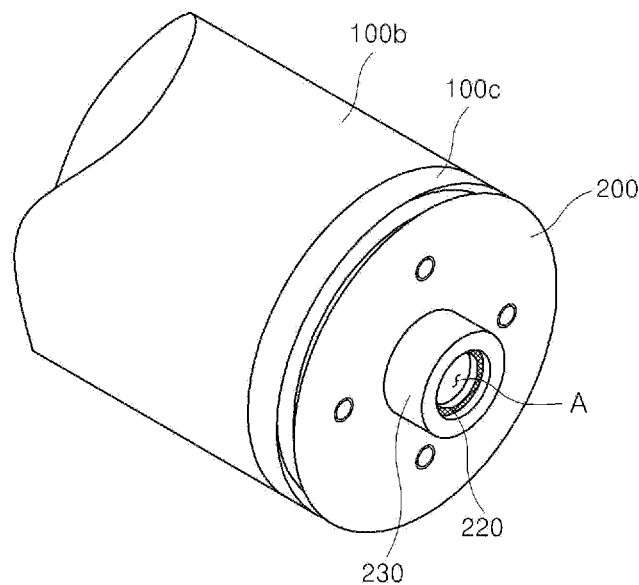
FIG. 7 is a view illustrating the light output wall protecting cover after being coupled to the light output wall of the body housing in accordance with the exemplary embodiment.

FIG. 3 is a cross-sectional view of a calibrating apparatus in accordance with an exemplary embodiment, FIG. 4 is a view illustrating an inner surface of a light output wall protecting cover which is spaced apart from and coupled to one side wall of a body housing in accordance with the exemplary embodiment, FIG. 5 is a view illustrating an outer surface of the light output wall protecting cover in accordance with the exemplary embodiment, FIG. 6 is a view illustrating the light output wall protecting cover before being coupled to a light output wall of the body housing in accordance with the exemplary embodiment, and FIG. 7 is a view illustrating the light output wall protecting cover after being coupled to the light output wall of the body housing in accordance with the exemplary embodiment.

A calibrating apparatus 1 includes a blackbody 110 which absorbs and radiates light, a body housing 100 which receives the blackbody 110 and a heater 500 therein, a light output wall protecting cover 200 which is spaced apart from and coupled to a light output wall 100c as a side wall of the body housing 100, and fixing members 300 which fix the light output wall protecting cover 200 to the light output wall 100c. The heater 500 which heats the blackbody 110 may be disposed in the body housing 100. Alternatively, the heater 500 which heats the blackbody 110 may be disposed outside the body housing 100.

The blackbody 110 has a radiant space S which is recessed into one end surface of the blackbody 110 so as to radiate radiant energy. Therefore, the radiant energy of the blackbody 110 is radiated from the radiant space S. For example, when the blackbody 110 is heated to approximately 600 C, the blackbody 110 radiates the radiant energy from the radiant space S thereof.

For reference, in a brief description of the blackbody 110, the blackbody 110 which is also called a complete blackbody is an object having an absorptive power of approximately 1, i.e., approximately 100%. A complete absorber is not present in practice, but there are many objects similar to that such as platinum black. Further, it is known that radiation from the blackbody is called blackbody radiation, and a simple relationship is established between a property (a wavelength and an intensity of energy) of the blackbody radiation and a temperature of the blackbody. Therefore, if the temperature of the blackbody is determined, the property of the blackbody is also determined, and thus the temperature of the blackbody may be obtained from the property of the blackbody. For example, since the sun may be regarded as the blackbody, a temperature of the sum may be estimated by measuring energy from the sun.

Therefore, the blackbody is an ideally complete absorber and radiator, i.e., an ideal object, which absorbs all incident radiation and in which reflection does not absolutely occur and also radiant energy is continuously generated at all wavelengths.

For reference, a basic formula of a radiation rate of the blackbody is provided according Plank's law, as follows:

$$W(\lambda, T) = \frac{C_1}{\lambda^5 e^{\frac{C_2}{\lambda T}} - 1} \qquad \text{-Formula 1-}$$

In formula 1, the radiation energy W is a function of a wavelength and a temperature, and thus if an intensity of the radiant energy having a particular wavelength $\lambda$ is known, it is possible to know a temperature of an object. However, formula 1 may be applied only to the ideal blackbody, and in practice, it is necessary to consider influence of an emissivity.

The emissivity $\epsilon$ is a ratio between the radiant energy radiated from the blackbody and energy and has a value of the emissivity, in which $0<\epsilon<1$. Here, the emissivity of the blackbody is 1. For example, in case of a silicon wafer, the emissivity thereof is generally approximately 0.7, and may have various values of approximately 0.1 to approximately 0.8 (when $\lambda=950$ mm) according to the environment. And a factor having an influence on variation of the emissivity includes a temperature of a substrate, a surface roughness thereof, a kind and thickness of a substance deposited on a surface thereof to be measured, an existence of a backside reflector thereof, a geometry of the surface, a shape of a chamber, a distance between a quartz rod and the substrate, a shape and thickness of the quartz, a center frequency and so on.

The body housing 100 receives the blackbody 110 therein and has the light output wall 100c having a light output port C communicated with the radiant space S thereof. The body housing 100 is a pillar-shaped body including one side wall as the light output wall 100c, the other side wall 100a configured to be opposite to the light output wall 100c in a length direction, and a side wall 100b configured to connect the light output wall 100c and the other wall 100a, and the blackbody 100 is disposed therein. At this time, the one side wall of the body housing 100, which is opposite to one end surface of the blackbody 110 opened in the radiant space S, is called the light output wall 100c. The light output port C as a though-hole is defined in the light output wall 100c so as to connect the radiant space S of the blackbody 110 and an outside thereof. The body housing 100 may be made of various materials which may insulate the blackbody 110 against heat transfer to the outside thereof.

The heater 500 as a means for heating the blackbody 110 may heat the blackbody 110 in various well-known manners such as a resistive type and a heat transfer type. The heater 500 may be disposed in the body housing 100 so as to heat the blackbody 110 through a thermal conductor 501, or may be disposed outside the body housing 100 so as to transfer heat to the blackbody 110 through a separate conductive medium and thus heat the blackbody 110.

The fixing members 300 (300a, 300b, 300c and 300d) serve to fix the light output wall protecting cover 200 to the light output wall 100c of the body housing 100. The fixing members 300 may be bolts. If the fixing members 300 are the bolts, the fixing members 300 may pass through cover fixing holes 201 (201a, 201b, 201c and 201d) of the light output wall protecting cover 200 and then may be screw-coupled to thread grooves 201 (201a, 201b, 201c and 201d) of the light output wall 100c of the body housing 100, such that the light output wall protecting cover 200 is spaced apart from and fixedly coupled to the light output wall 100c of the body housing 100.

Hereinafter, in the exemplary embodiment, an example in which the light output wall protecting cover 200 having a light blocking plate 210 is spaced apart from and coupled to the light output wall 100c of the body housing 100 will be described. However, other example in which the light output wall protecting cover 200 having the light blocking plate 210 is not spaced apart from, but fixedly in close contact with the light output wall 100c of the body housing 100 may be applied.

The light output wall protecting cover 200 is a cover which has the light blocking plate 210 disposed at a position opposite to the light output port C, and is coupled to the light output port C of the body housing 100 so as to provide a passage connecting the light output port C of the body housing 100 and an external environment. The passage may be defined by providing a through-hole in a side surface of the light output wall protecting cover 200 or a separation space between the light output wall protecting cover 200 and the light output wall 100c. Hereinafter, an example in which the light output wall protecting cover 200 is spaced apart from and coupled to the light output wall 100c will be described, but the light output wall protecting cover 200 may be applied to a case in which the passage is defined by providing the through-hole in the side surface of the light output wall protecting cover 200.

As the light output wall protecting cover 200 is spaced apart from and coupled to the light output wall 100c of the body housing 100, the separation space may be defined between the light output wall protecting cover 200 and the light output wall 100c of the body housing 100 so as to be communicated with the outside therethrough, and thus an external environmental atmosphere (such as a convection current) may be introduced through the separation space and then introduced into the radiant space S of the blackbody 110 through the light output port C defined in the light output wall 100c. On the contrary to this, an internal environmental atmosphere in the radiant space S of the blackbody 110 may be exhausted through the light output port C. Therefore, since the radiant space S of the blackbody 110 is not isolated due to the separation space, it is possible to rapidly increase the temperature of the blackbody 110.

The separation space between the light output wall protecting cover 200 and the light output wall 100c of the body housing 100 may be designed in various manners. In the exemplary embodiment, as illustrated in FIG. 4, at least one or more separation members 250 (250a, 250b, 250c and 250d) protrude on an inner surface 240a (opposite to the light output wall 100c of the body housing 100) of the light output wall protecting cover 200, such that protruding surfaces of the separation members 250 are in contact with the light output wall 100c of the body housing 100 and thus the separation space corresponding to a protruding height of each of the separation members 250 is defined. However, the separation space is not limited to this exemplary embodiment, and may be defined in various manners. For example, in case that the fixing members includes bolts and nuts in order to couple the light output wall protecting cover 200 to the light output wall 100c, the nuts may be disposed between the light output wall protecting cover 200 and the light output wall 100c of the body housing 100 and thus may define the separation space corresponding to a thickness of each of the nuts.

Hereinafter, the exemplary embodiment in which the at least one or more separation members 250 protrude on the inner surface 240a of the light output wall protecting cover 200, such that the protruding surfaces of the separation members 250 are in contact with the light output wall 100c of the body housing 100 and thus the separation space corresponding to the protruding height of each of the separation members 250 is defined, will be described.

The light output wall protecting cover 200 includes a cover plate 240, a cover through-hole A, a transparent blocking plate coupling portion 230, the separation members 250, and cover fixing holes 201.

Referring to FIGS. 4 and 5, the cover plate 240 includes the inner surface 240a which is opposite to the light output wall 100c of the body housing 100, and an outer surface 240b which is located at an opposite side of the inner surface 240a. Here, the inner surface 240a means a surface opposite to the light output wall 100c of the body housing 100, and the outer surface 240b means a surface opposite the inner surface 240a to be in contact with an external environment. The cover plate 240 may have a shape corresponding to that of the light output wall 100c of the body housing 100. For example, if the light output wall 100c has a circumferential surface shape, the cover plate 240 may also have a circular shape which is the same as that of the light output wall 100c.

An inclined surface B1 (hereinafter, referred to as a "first inclined surface") may be provided at an edge of the inner surface 240a of the cover plate 240 to be inclined toward an end of the edge. The inclined surface B1 has an inclined portion of which a thickness becomes thinner toward the end of the edge. The outer surface 240b has not the inclined portion and only the inner surface 240a has the inclined portion to be inclined toward the end of the edge. Therefore, external air may be easily introduced through the separation space defined by the inclined portion of the inclined surface B1.

Further, as illustrated in FIG. 3, a second inclined surface B2 is defined at an edge of the light output wall 100c of the body housing 100 so as to be opposite to the first inclined surface B1 and thus provide the separation space. That is, the second inclined surface B2 is defined at edge of the light output wall 100c so as to have the same inclination as that of the first inclined surface B1 in the same direction, such that the separation space between the light output wall 100c of the body housing 100 and the inner surface 240a of the cover plate 240 has a uniform interval. Therefore, the first and second inclined surfaces B1 and B2 are opposite to each other to have the same inclination in the same direction, and thus the external air may be efficiently introduced.

The cover through-hole A passing through the first and second inclined surfaces B1 and B2 of the cover plate 240 is defined at a position opposite to the light output port C so as to have a similar diameter to the light output port C. Therefore, the radiant energy discharged from the light output port C may smoothly pass through the cover through-hole A.

The transparent blocking plate coupling portion 230 is a through-portion protruding from the outer surface 240b and having a central hole connected with the cover through-hole A and the transparent blocking plate 210 which blocks the central hole. The transparent blocking plate 210 is installed to be in contact with an inner diameter of the central hole and thus block the central hole from the external environment.

As illustrated in FIG. 3, the transparent blocking plate coupling portion 230 includes a first circumferential through-portion 230a, a second circumferential through-portion 230b, the transparent blocking plate 210 and a circumferential ring 220.

In the transparent blocking plate coupling portion 230, the first and second circumferential through-portions 230a and 230b having different diameters from each other are connected with each other to have a stepped structure. The first circumferential through-portion 230a has an inner circumference (hereinafter, referred to as a "first inner circumference") having a predetermined diameter, and a first circumferential protruding surface 231 which define a flange surface at a distal end of the cover through-hole A. The second circumferential through-portion 230b has a second inner circumference having a larger diameter than that of the first inner circumference, and a screw thread (hereinafter, referred to as a "second circumferential screw thread") defined in an inner surface of the second inner circumference. Therefore, first and second circumferential through-portions 230a and 230b are connected with each other through the first circumferential protruding surface 231 so as to have the stepped structure.

The transparent blocking plate 210 has a smaller diameter than that of the second inner circumference of the second circumferential through-portion 230b, and thus may be screw-coupled to and inserted into the central hole of the second circumferential through-portion 230b. At this time, the transparent blocking plate 210 having inner and outer surfaces may be installed so that the inner surface of the transparent blocking plate 210 is in contact with the first circumferential protruding surface 231. In a state in which the transparent blocking plate 210 is inserted into the second circumferential through-portion 230b so that the inner surface of the transparent blocking plate 210 is in contact with the first circumferential protruding surface 231, the circumferential ring 220 having a screw thread defined in an outer circumferential surface thereof is inserted into the second inner circumference of the second circumferential through-portion 230b in a screw-coupling manner. Therefore, the circumferential ring 220 may be rotated along the second circumferential screw thread and tightened to the second circumferential through-portion 230b, and finally fixedly in close contact with the first circumferential protruding surface 231. Therefore, by the screw-coupling of the circumferential ring 220, the transparent blocking plate 210 may be coupled and fixed to an inner portion of the second circumferential through-portion 230b.

The transparent blocking plate 210 serves to prevent foreign substances from being introduced into the blackbody and particularly is made of a material which transmits the radiant energy having a low temperature of approximately 600° C. or less in the exemplary embodiment. Generally, an object having the low temperature of approximately 600 C or less radiates the radiant energy having a wavelength of approximately 5 μm to approximately 20 on. Therefore, the blackbody 110 used in calibrating a low temperature measuring pyrometer also radiates the radiant energy having the low temperature of approximately 600° C. or less, and the transparent blocking plate 210 of the blackbody 110 has to transmit the low temperature radiant energy having the wavelength of approximately 5 μm to approximately 20 μm. To this end, in the exemplary embodiment, the transparent blocking plate 210 may be made of a material which may transmit the long wavelength of approximately 5 μm to approximately 20 μm. The material which may transmit the long wavelength may be a material which includes one or more of $BaF_2$, $CaF_2$ and Ge. By using the transparent blocking plate 210 made of the material which may transmit the long wavelength, it is possible to transmit the low temperature radiant energy, while blocking the foreign substances. For reference, in case of the transparent blocking plate made of quartz or sapphire, it is possible to block the foreign substances, but not to transmit the low temperature radiant energy having the wavelength of approximately 5 μm to approximately 20 μm (approximately 600° C. or less).

Further, the transparent blocking plate 210 made of the material which may transmit the low temperature radiant energy having the wavelength of approximately 5 μm to approximately 20 μm may be embodied into one of a convex lens and a concave lens. The reason why the transparent blocking plate 210 is embodied into one of the convex lens and the concave lens is because it is possible to precisely transfer the temperature of a certain point of the blackbody 110 to an external pyrometer. Furthermore, the transparent blocking plate 210 made of the material which may transmit the low temperature radiant energy having the wavelength of approximately 5 μm to approximately 20 μm may be embodied into an assembly of a plurality of convex lenses, an assembly of a plurality of concave lenses, and an assembly of the plurality of convex lenses and concave lenses. These lens assembly structures may embody desired focus concentration, and thus may transfer the precise temperature of the blackbody 110 to the external pyrometer.

Meanwhile, the separation space may be provided between the light output wall protecting cover 200 and the light output wall 100c of the body housing 100 by the one or more separation members 250 protruding on the inner surface 240a of the light output wall protecting cover 200. As illustrated in FIG. 4, the separation members 250 has a structure of protruding on the inner surface of the light output port 110c and serves to enable the protruding surfaces of the separation members 250 to be in contact with the light output wall 100c of the body housing 100. Therefore, when the light output wall protecting cover 200 is coupled to the light output wall 100c of the body housing 100, the inner surface of the light output wall protecting cover 200 is not directly in contact with the light output wall 100c, but the protruding surfaces of the separation members 250 protruding on the inner surface may be in contact with the light output wall 100c and then fixedly coupled thereto.

The at least one or more separation members 250 may be provided on the inner surface of the light output wall protecting cover 200. When the separation member 250 is provided in plural, the separation members 250 may be disposed on the inner surface 240a of the light output wall protecting cover 200 to be spaced apart from each other at regular intervals. The separation members 250 have the cover fixing holes 201 passing through the separation members 250, respectively. A screw thread is formed in an inner circumferential surface of each of the cover fixing holes 201, and thus each of the fixing members 300 passing through the cover fixing holes 201 may be screw-coupled to the inner circumferential surface of each of the cover fixing holes 201. For reference, a stopper which is a groove having a larger diameter than that of each of the cover fixing holes 201 is formed at each of the cover fixing holes 201 so as to provide a stepped surface between the stopper and each of the cover fixing holes 201. Therefore, by the stepped surface, the fixing members 300 may not completely pass through the cover fixing holes 201, but may be in close contact with the outer surface 240b of the light output wall protecting cover 200 and thus may tighten the light output wall protecting cover 200.

As illustrated in FIG. 6, cover tightening grooves 102 having a screw thread defined in an inner circumferential surface thereof are provided in the light output wall 100c of the body housing 100 so as to correspond to the cover fixing holes 201 defined in the separation members 250. Therefore, when each of the fixing members 300 (e.g., the bolt) passes through each of the cover fixing holes 201, a distal end of each of the fixing members 300 is inserted into and screw-coupled to each of the cover tightening grooves 102, and thus the light output wall protecting cover 200 may be fixed to the light output wall 100c of the body housing 100 in the screw-coupling manner.

Figure 8:
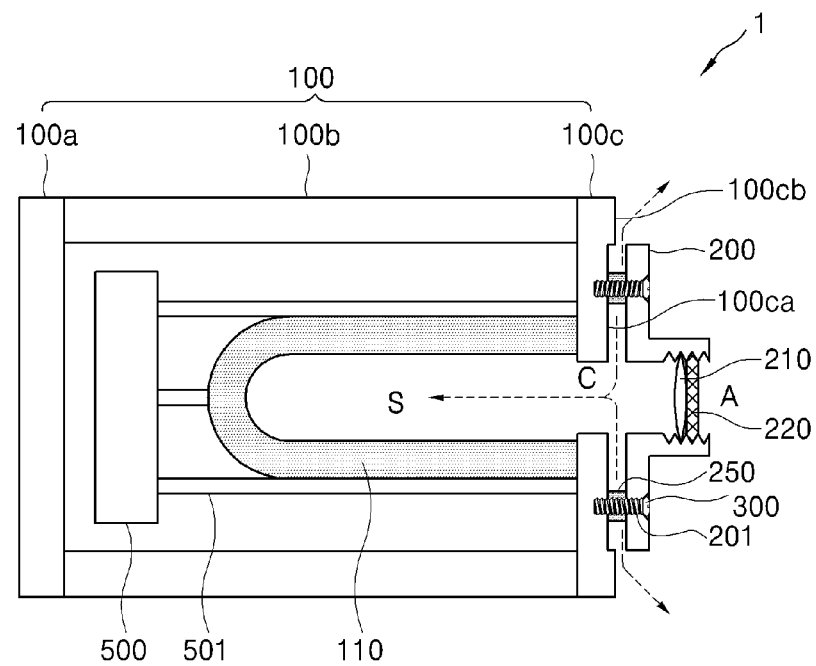
FIG. 8 is a cross-sectional view of the calibrating apparatus in which the light output wall protecting cover is spaced apart from and coupled to only a part of the light output wall of the body housing in accordance with the exemplary embodiment.
Figure 9:
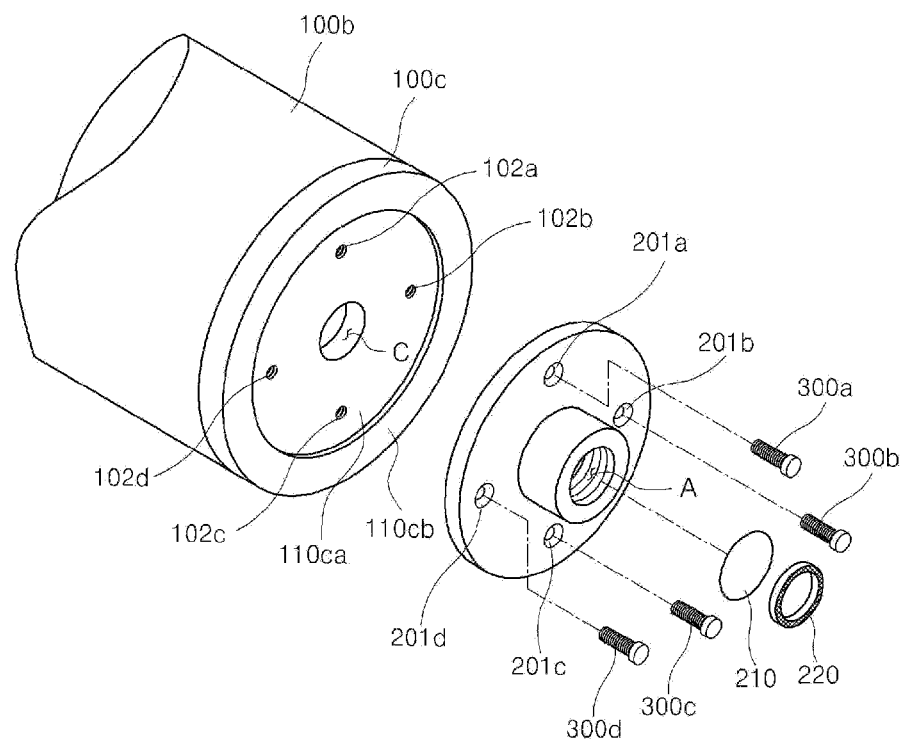
FIG. 9 is a view illustrating the light output wall protecting cover before being coupled to the part of the light output wall of the body housing in accordance with the exemplary embodiment.
Figure 10:
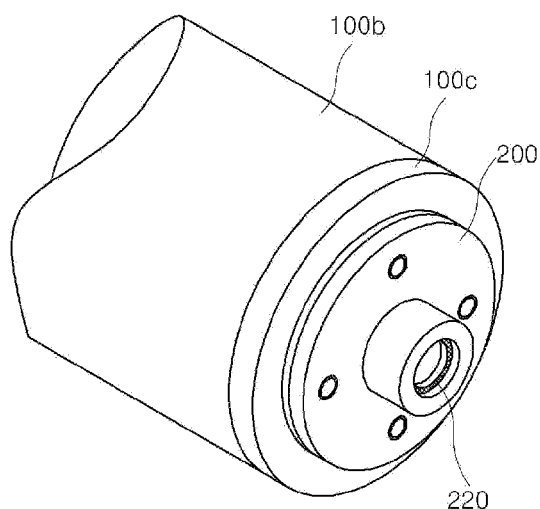
FIG. 10 is a view illustrating the light output wall protecting cover after being coupled to the part of the light output wall of the body housing in accordance with the exemplary embodiment.

Meanwhile, FIGS. 3 to 7 illustrate the exemplary embodiment in which the light output wall protecting cover 200 is spaced part from and coupled to the whole light output wall 100c of the body housing 100. FIGS. 8 to 10 illustrate another exemplary embodiment of the light output wall protecting cover 200. Detailed descriptions of portions corresponding to those in the above embodiment will be omitted.

FIG. 8 is a cross-sectional view of the calibrating apparatus in which the light output wall protecting cover is spaced apart from and coupled to only a part of the light output wall of the body housing in accordance with the exemplary embodiment, FIG. 9 is a view illustrating the light output wall protecting cover before being coupled to the part of the light output wall of the body housing in accordance with the exemplary embodiment, and FIG. 10 is a view illustrating the light output wall protecting cover after being coupled to the part of the light output wall of the body housing in accordance with the exemplary embodiment.

The light output wall protecting cover 200 is spaced apart from and coupled to only a part of the light output wall 100c of the body housing 100. To this end, the light output wall 100c of the body housing 100 includes a central light output wall 100ca which is covered by the light output wall protecting cover 200 spaced apart therefrom and coupled thereto, and an edge light output wall 100cb which is not covered by the light output wall protecting cover 200. The central light output wall 100ca means a portion which has the light output port C centered therein so as to enclose the light output port C, and the edge light output wall 100cb means a portion which encloses the central light output wall 100ca.

The central light output wall 100ca has a thickness different from that of the edge light output wall 100cb. Particularly, the thickness of the central light output wall 100ca is smaller than that of the edge light output wall 100cb. Therefore, when seeing in a direction toward the light output wall 100c of the body housing 100, the central light output wall 100ca and the edge light output wall 100cb have a stepped structure due to a thickness difference therebetween so that the central light output wall 100ca is recessed inside compared with the edge light output wall 100cb.

In a structure of the central light output wall 100ca, the central light output wall 100ca has a donut shape having inner and outer circumferences, and the inner circumference of the central light output wall 100ca is in contact with the light output port C centered therein. Further, the light output wall protecting cover 200 has a smaller diameter than that of the outer circumference, and thus the light output wall protecting cover 200 may be spaced apart from and coupled in an area of the central light output wall 100ca. That is, the light output wall protecting cover 200 is located only in the area of the central light output wall 100ca, but not outside the edge light output wall 100cb.

The light output wall protecting cover 200 coupled to the central light output wall 100ca is in contact with the central light output wall 100ca through protruding surfaces of the plurality of separation members 250 protruding on the inner surface of the light output wall protecting cover 200, and thus spaced apart from the central light output wall 100ca. The radiant space of the blackbody 110 may be communicated with the outside through the separation space.

According to the exemplary embodiment, since the light output port of the calibrating apparatus is blocked by the transparent blocking plate, it is possible to prevent the introduction of the foreign substances. Further, according to the exemplary embodiment, since the transparent blocking plate is made of a material which may transmit the long wavelength, it is possible to transmit the radiant energy radiated from the blackbody having a low temperature. Further, according to the exemplary embodiment, since the separation space as a passage between the internal space of the blackbody and the outside environment is provided in the calibrating apparatus, it is possible to enhance a heat exchanging effect with the outside environment. Therefore, it is possible to reduce a time period until the blackbody arrives at the reference temperature, due to the enhancement of the heat exchanging efficiency. Further, according to the exemplary embodiment, since the transparent blocking plate is provided, it is possible to minimize the introduction of the foreign substances and also rapidly stabilize the temperature of the blackbody.

Although the apparatus for calibrating the pyrometer has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. An apparatus for calibrating a pyrometer, comprising:
    a blackbody comprising a radiant space from which radiant energy can be radiated;
    a body housing configured to receive the blackbody therein and comprising a light output wall having a light output port connected with the radiant space;
    a light output wall protecting cover comprising a transparent blocking plate disposed at a position opposite to the light output port so as to transmit a long wavelength of approximately 5 μm to approximately 20 μm and configured to be coupled with the light output wall of the body housing; and
    a fixing member configured to fix the light output wall protecting cover to the light output wall of the body housing,
    wherein the light output wall protecting cover is spaced apart from and coupled to the light output wall of the body housing so as to define a passage connecting the light output port of the body housing and an external environment such that the radiant space communicates with the external environment and a heat-exchange effect with the external environment is enhanced.

2. The apparatus of claim 1, wherein the transparent blocking plate includes at least one compound selected from the group consisting of $BaF_2$, $CaF_2$ and Ge.

3. The apparatus of claim 1, wherein the transparent blocking plate is one selected from the group consisting of a convex lens, a concave lens, an assembly of convex lenses, an assembly of concave lenses, and an assembly of convex lenses and concave lenses.

4. The apparatus of claim 1, wherein the light output wall protecting cover comprises:
    a cover plate comprising an inner surface opposite to the light output wall of the body housing, and an outer surface located at an opposite side of the inner surface;
    a cover through-hole configured to pass through the inner surface and the outer surface at a position opposite to the light output port;
    a transparent blocking plate coupling portion which is a through-portion protruding from the outer surface and comprising a central hole connected with the cover through-hole and a transparent blocking plate which blocks the central hole;

a separation member configured to protrude on the inner surface so as to enable a protruding surface thereof to be in contact with the light output wall of the body housing; and a cover fixing hole configured to pass through the protruding surface of the separation member and the outer surface.

5. The apparatus of claim 4, wherein the transparent blocking plate coupling portion comprises:

a first circumferential through-portion comprising a first inner circumference and a first circumferential protruding surface configured to protrude from the outer surface of the cover through-hole;

a second circumferential through-portion comprising a second inner circumference having a larger diameter than that of the first inner circumference, and a screw thread configured to be defined in an inner surface of the second inner circumference; and a circumferential ring configured to be in contact with the outer surface of the transparent blocking plate, coupled along the screw thread and fix the transparent blocking plate to the first circumferential protruding surface, wherein the transparent blocking plate is configured to have an inner surface and an outer surface, the inner surface being in contact with the first circumferential protruding surface.

6. The apparatus of claim 4, wherein an edge of the inner surface comprises a first inclined surface configured so that a thickness of the cover plate becomes thinner toward a distal end of the cover plate.

7. The apparatus of claim 6, wherein an edge of the light output wall of the body housing comprises a second inclined surface configured to be opposite to the first inclined surface so as to have a uniform separation space between the first and second inclined surfaces.

8. The apparatus of claim 4, wherein the light output wall of the body housing comprises:

a central light output wall configured to be covered by the light output wall protecting cover spaced apart therefrom and coupled thereto;

an edge light output wall configured to be not covered by the light output wall protecting cover, wherein the central light output wall and the edge light output wall have a thickness difference so that a thickness of the central light output wall is smaller than that of the edge light output wall.

9. The apparatus of claim 8, wherein the central light output wall has a donut shape comprising inner and outer circumferences, and the inner circumference of the central light output wall is in contact with the light output port.

10. The apparatus of claim 9, wherein the light output wall protecting cover has a smaller diameter than that of the outer circumference, and the light output wall protecting cover is spaced apart from and coupled to the central light output wall in the outer circumference of the central light output wall.

* * * * *